3,387,921
PROCESS FOR THE SELECTIVE RECOVERY
OF ALUMINA FROM ORES
Carl K. Amano and Melvin L. Taylor, Denver, Colo., assignors to Allied Chemical Corporation, New York, N.Y., a corporation of New York
No Drawing. Filed Jan. 29, 1964, Ser. No. 341,109
6 Claims. (Cl. 23—102)

ABSTRACT OF THE DISCLOSURE

A process for the selective recovery of alumina from an aluminous or which includes a contacting of the ore with nitrogen peroxide and water at a temperature of at least 130° C. and at elevated pressure. For each mole of alumina in the ore there is present 4–21 moles $NO_2$ and 6–21 moles $H_2O$. Aluminum nitrate hydrate is recovered and calcined to produce alumina. The excess nitrogen oxides and the gaseous nitrogen-containing by-products of the process are recovered.

It is an object of the invention to provide a process for the lixiviation, or leaching out, of alumina from aluminaceous ores, equally applicable to high-grade as well as to low-grade ores.

It is another object of the invention to provide a process for the lixiviation of alumina, wherein the leaching agent may be recovered for re-use.

In accordance with the invention it was found that the lixiviation of alumina with good selectivity from the gangue materials can be accomplished by using 4–21 mols $NO_2$, and 6–21 mols $H_2O$ for each mol of $Al_2O_3$ in the ore. The lixiviation reaction is conducted at a temperature of at least 130° C. under autogenous pressure. It is to be understood that by referring to $NO_2$ in the specification and the claims, equivalent amounts of $N_2O_4$ to ore also are meant to be included in the designation, in view of the suitability of both $NO_2$, $N_2O_4$, and mixtures thereof for the process of the invention; and also because of the well known equilibrium conditions between $NO_2$ and $N_2O_4$.

The process of the invention is conducted in accordance with the following flow diagram:

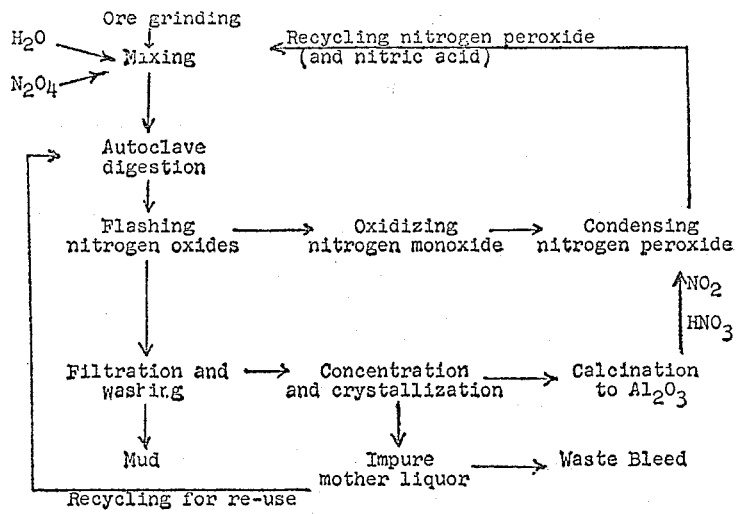

This invention relates to the treatment of aluminum ores to recover the aluminum content thereof substantially separately from the other constituents.

The principal ore used in the production of aluminum is bauxite, an alumina hydrate mineral. Most generally the Bayer process is used to prepare alumina ($Al_2O_3$) from bauxite, preparatory to the manufacturing of aluminum metal by the known electrolytic process. In the Bayer process caustic soda is used to dissolve the alumina from the bauxite as sodium aluminate and this reaction leaves the impurities in suspension. The silica solubilized from the bauxite ore reacts further to form insoluble complex sodium aluminum silicates.

In the Western Hemisphere bauxite deposits suitable as raw materials for the production of high quality or cell-grade alumina generally occur in countries having a lower degree of industrialization, for instance, most of the bauxite used in the United States is imported from Surinam and Caribbean countries. Domestic ore deposits, such as Arkansas bauxite, or clays, which are alumina hydrosilicates, contain excessive amounts of silica gangue for economical processing by the Bayer process. Above minimal silica content in the raw material is undesired for lixiviation by the Bayer process, because the caustic consumption of the silica gangue renders the process uneconomical, and also since the silica is removed in the form of sodium aluminum silicate, the desired yield of sodium aluminate becomes correspondingly lower.

Accordingly, bauxite or other aluminaceous ore, after suitable dressing or any other desired preparatory technique, is ground and mixed with water and nitrogen peroxide ($N_2O_4$), in accordance with the following reactions:

$$3N_2O_4 + 2H_2O \rightleftharpoons 2NO + 4HNO_3 \quad (1)$$

The nitric acid formed in accordance with (1) reacts to form aluminum nitrate hydrate $$6HNO_3 + Al_2O_3 \rightarrow 2Al(NO_3)_3 \cdot XH_2O \quad (2)$$

The above equations show fundamental reactions; however, in operation, it is preferred to maintain an adequate excess of water over the minimum range of 6 mols of water per mol of $Al_2O_3$. This is so because a certain minimal excess of water over the theoretical is desirable to be left over after the reaction to maintain the reaction mixture in slurry form after the liquid $N_2O_4$ has reacted or volatilized. The addition of about 6 mols of water per mol of bauxite alumina resulted in very thick paste-like reaction mixtures that tend to crystallize and set up at 150–155° C., therefore the use of at least 10–12 mols $H_2O$ per mol of $Al_2O_3$ is preferred.

After the ore is mixed with the appropriate amounts of water and nitrogen peroxide, the entire mixture is transferred into an autoclave and digested under agitation, and under elevated temperature and pressure. Under the autoclave digestion conditions the water reacts with the nitrogen peroxide to form nitric acid. By maintaining an elevated pressure of at least 600 p.s.i.g. in the autoclave, the formation of nitric acid may be retarded so that the equilibrium conditions of Equation 1 are shifted somewhat in the left-hand direction, thereby allowing only a part of the water and $N_2O_4$ to form nitric acid. This will make it possible that after the autoclave step, even though the stoichiometric excess of $N_2O_4$ may, for economic considerations, be even less than the stoichiometric excess of water, not substantially more nitric acid will be formed than is theoretically necessary to lixiviate the alumina contents of the ore, without any substantial lixiviation of the iron and titania contents thereof. The unreacted excess water and $N_2O_4$ can then be recovered by flashing them off after the autoclave digestion. As the reaction mass is agitated in the autoclave, the formed nitric acid is evenly distributed throughout the bulk of the ore, as aided by the excess amounts of unreacted nitrogen peroxide and water.

It is a principal feature of the invention that the nitric acid selectively lixiviates or leaches out only the alumina, and leaves the silica, iron, and titania contents of the ore substantially in the undissolved mud after the autoclave digestion.

At the completion of the leaching step in the autoclave, the resulting slurry consists of the aluminum pregnant solution and the mud, the latter containing the other, unwanted, constituents. The slurry is subsequently flashed to remove NO and excess $NO_2$. The NO content of the flashed-off gas is oxidized to $NO_2$ by means of air or oxygen, and subsequently the entire amount of $NO_2$, including the freshly oxidized part, is condensed and the resulting nitrogen peroxide is recirculated for re-use in the autoclave-digestion step of the process.

The slurry resulting from the autoclave-digestion step is filtered free of solids and the solids are further washed to recover substantially all of the aluminum pregnant solution. The solids may be discarded or, if desired, used for the recovery of other constituents, such as titania, as is done in the case of the red mud of the Bayer process.

An additional advantage of the process of this invention is that the high-iron residues (about 75% $Fe_2O_3$) resulting from the treatment of high-grade bauxites can be used as a source of iron in the iron and steel industry. The "red muds" from the Bayer process cannot be utilized because of their high alkali content.

The aluminum pregnant solution recovered by filtration from the autoclave slurry is subjected to an evaporation step to concentrate the aluminum nitrate. Subsequently the solution is cooled to crystallize aluminum nitrate hydrate from the mother liquor, which may still retain minor further amounts of impurities. The aluminum nitrate crystals are separated from the mother liquor and are calcined to decompose the nitrate to form aluminum oxide.

In the decomposition of the aluminum nitrate hydrate, nitric acid and water are formed along with the alumina, for instance, according to the following equation:

$$2[Al(NO_3)_3 \cdot 3H_2O] \rightarrow Al_2O_3 + 6HNO_3 + 3H_2O \quad (3)$$

In reality due to the various equilibrium conditions as well as possible nitrogen oxides retained in the product, not all the nitrogen is recovered as nitric acid, but also some nitrogen peroxide is recovered. The water and the nitric acid may be separated from the nitrogen peroxide by condensation, or may be recirculated therewith for re-use together with the makeup material and with fresh ore in the autoclaving step. If the proportion of nitric acid would be too high for use in the makeup material, the process can also be used as an excess nitric acid by-product producer. Extremely little or no disproportionation of the gases and thereby no loss in the form of nitrogen occurs in the autoclaving or calcining steps.

It is an apparent expedient to select a reasonably short dwell time for the autoclave step and determine the optimum values for the other process parameters for such selected reasonably short dwell times. Therefore, for instance, a reaction or dwell time of 90 minutes could be considered to be a practically excessive period. It was found that by an appropriate selection of the process parameters, in a preferred embodiment of the invention, a satisfactory lixiviation of the aluminum from the ore can be obtained within 60 and even 30 minutes, with suitable selectivity over iron and titania gangues components.

In the following, specific examples of the process according to the invention are given, utilizing three different aluminaceous ores.

Examples 1–6

In Examples 1–5 Jamaican bauxite and in Example 6 a higher grade Arkansas ore were used. The starting materials of the examples contain the following major ingredients in percent by weight:

| Example Nos. | $Al_2O_3$ | $Fe_2O_3$ | $TiO_2$ | $SiO_2$ |
|---|---|---|---|---|
| 1–5 | 49.9 | 19.1 | 2.4 | 0.8 |
| 6 | 49.7 | 9.15 | 2.55 | 6.9 |

In the following, typical processing details are set forth. The ore sample was ground to nominal 65 mesh size and then mixed with water and $N_2O_4$ in relative amounts indicated in Table I below. The resulting slurry was stirred and heated in an autoclave at a temperature, pressure, and dwell time, as specified in Table I. Subsequently the slurry was cooled to 100° C. and the nitrogen oxides were flashed off. The NO content of the flashed off gas was oxidized to $NO_2$ in the presence of air. The products from the autoclave were diluted with 300 parts by weight hot water; the pH of the liquid was about 1.5. Hot water was then added to bring the slurry to about 1000 parts by weight. Subsequently the slurry was filtered and the residue was washed to yield a total filtrate of about 2500 parts by weight, having about 3.0 pH. The aluminum nitrate-containing solution was subsequently concentrated by evaporation, and then cooled to precipitate aluminum nitrate hydrate crystals. The crystals were separated from the mother liquor and calcined at 600° C. for one hour to obtain $Al_2O_3$. Nitric acid and $NO_2$ released during the calcining step were condensed and returned to the ore treatment stage of the process as equivalents to part of the water and $N_2O_4$, as required.

Table I summarizes the specific results of Examples 1–6 conducted in accordance with the preceding processing steps.

TABLE I

| Example Number | Ore sample, parts by wt. | $N_2O_4$, parts by wt. | $H_2O$, parts by wt. | Dwell time, minutes | Temp., °C. | Pressure, p.s.i.g. | Alumina extraction, percent wt. | Extraction ratio, $Al_2O_3/FeO_3$ |
|---|---|---|---|---|---|---|---|---|
| 1 | 100 | 335 | 79 | 30 | 133 | 800 | 72.7 | 7,900 |
| 2 | 150 | 377 | 186 | 30 | 172 | 1,000 | 95.4 | 3,570 |
| 3 | 100 | 160 | 56 | 30 | 172 | 650 | 88.2 | 690 |
| 4 | 100 | 312 | 124 | 60 | 172 | 1,400 | 91.8 | 3,600 |
| 5 | 150 | 377 | 186 | 90 | 153 | 900 | 89.2 | 9,030 |
| 6 | 100 | 263 | 124 | 30 | 169 | 1,175 | 85.4 | 1,915 |
| Comparison | 50 | 300 | 67 | 30 | 136 | 600 | 70 | 7 |

As can be noted from Table I, high alumina yields can be obtained by the present invention even when the starting material has a high silica content, and the alumina content of the ore can be favorably recovered with desirably high alumina to iron oxide weight ratios at a 30 minute dwell time in the autoclave. The pressure in the autoclave is due to unreacted $NO_2$ and $NO$, the latter being formed in the autoclaving step. The alumina obtained after the calcining step contains in the neighborhood of 0.01% Na, 0.02% Fe, 0.001% Ti, and 0.01% Si, along with minor amounts of other contaminants. These concentrations are generally considered well within the allowable range of contaminants for cell grade alumina.

In Table I there is also a comparison run shown, wherein the ore composition was identical to the composition of the ore used in Examples 1–5. In the comparison run, as can be seen, poor selectivity is obtained, since the ratios of $NO_2$ and $H_2O$ to $Al_2O_3$ are well in excess over the ratios in accordance with the invention.

The invention is disclosed by way of specific examples, but the scope of the invention is to be interpreted from the entire specification as limited only by the appended claims.

We claim:

1. A process for the selective recovery of alumina from an aluminaceous ore, which comprises contacting the ore with nitrogen peroxide and water at a temperature of at least 130° C. and under elevated pressure of at least 600 p.s.i.g., 4–21 mols $NO_2$ and 6–21 mols $H_2O$ being present for each mol of alumina in the ore to form aluminum nitrate hydrate therewith, recovering the excess nitrogen oxides, and recovering the aluminum nitrate hydrate.

2. The process of claim 1, further comprising the steps of calcining the recovered aluminum nitrate hydrate to form alumina, and recovering the gaseous nitrogen-containing by-products.

3. The process of claim 2, wherein at least 10 mols of water per mol of $Al_2O_3$ is used.

4. The process of claim 3 wherein said step of recovering nitrogen oxides comprises flashing the autoclave residue, oxidizing the nitrogen monoxide component of the flashed off nitrogen oxides, and condensing said nitrogen oxides to form $N_2O_4$.

5. The process of claim 4 wherein said step of recovery further comprises recovering the gaseous by-products of said calcination step.

6. The process of claim 5 wherein said recovered $N_2O_4$ and said recovered gaseous by-products which contain nitric acid are recirculated for use in said step of contacting said starting material.

References Cited

UNITED STATES PATENTS

| | | | |
|---|---|---|---|
| 1,357,089 | 10/1920 | Goldschmidt et al. | 23—141 |
| 2,019,553 | 11/1935 | Willmore et al. | 23—141 |
| 2,127,504 | 8/1938 | Derr et al. | 23—102 |
| 2,285,443 | 6/1942 | Kinzie et al. | 23—102 |
| 3,240,562 | 3/1966 | Brown et al. | 23—143 |

OSCAR R. VERTIZ, *Primary Examiner.*

HERBERT T. CARTER, *Assistant Examiner.*